United States Patent [19]

Tanaka et al.

[11] Patent Number: 4,472,236

[45] Date of Patent: Sep. 18, 1984

[54] METHOD FOR ETCHING FE-NI ALLOY

[75] Inventors: Hiroshi Tanaka; Makoto Harigae, both of Fukaya, Japan

[73] Assignee: Tokyo Shibaura Denki Kabushiki Kaisha, Kawasaki, Japan

[21] Appl. No.: 479,849

[22] Filed: Mar. 28, 1983

[30] Foreign Application Priority Data

Mar. 29, 1982 [JP] Japan .................................. 57-48975

[51] Int. Cl.[3] ........................... C23F 1/02; B44C 1/22; C03C 15/00; C03C 25/06

[52] U.S. Cl. .................................... 156/642; 156/640; 156/644; 156/659.1; 156/345; 252/79.3

[58] Field of Search ............... 156/640, 642, 644, 654, 156/659.1, 345; 134/3, 41, 10; 430/23, 313, 318; 252/79.2, 79.3

[56] References Cited

FOREIGN PATENT DOCUMENTS 158342 12/1979 Japan .................................. 156/642

*Primary Examiner*—William A. Powell

*Attorney, Agent, or Firm*—Cushman, Darby & Cushman

[57] ABSTRACT

A method for etching an Fe-Ni alloy by reacting the Fe-Ni alloy with an etching solution which contains ferric chloride, has the step of adding $Cl_2$ and $H_2O$ in a reaction system of the etching solution and the Fe-Ni alloy, thereby producing ferric chloride, and thus, preventing degradation of the etching capability of the etching solution.

5 Claims, 2 Drawing Figures

METHOD FOR ETCHING FE-NI ALLOY

BACKGROUND OF THE INVENTION

The present invention relates to a method for etching an alloy containing iron and nickel as major components. More particularly, the present invention relates to a method for controlling a composition of an etching solution for micro-etching a shadow mask sheet of invar steel.

Conventionally, a mild steel plate has been used as a shadow mask mounted in a color cathode ray tube. In a shadow mask mounted in a color cathode ray tube which requires a high definition display and high resolution display, the diameter and pitch of the electron beam apertures must be made very small and with high precision. For example, in a shadow mask having circular apertures for passing the electron beams therethrough, the pitch is 0.2 mm, and the aperture diameter on the side of the electron gun is about 0.1 mm.

The most important function of a shadow mask for a color cathode ray tube is to transmit an electron beam through apertures of the shadow mask and to radiate correctly the electron beam onto predetermined positions of a phosphor screen. However, during operation the shadow mask expands due to heating by the electron beams radiated from the electron gun. As a result, the electron beam is not radiated correctly onto the predetermined positions of the phosphor screen, resulting in so-called mislanding, and hence, poor color purity.

This leads to a decisive drawback in the color cathode ray tube. Since invar steel has a very low linear expansion coefficient it may be used to solve the above problem. Invar steel is a nickel steel material and has a general composition of 0.2% or less of carbon, 0.5% manganese, 36% nickel and iron as the balance. Invar steel has a very low linear expansion coefficient of about $1\times10^{-6}$/deg at a temperature range of 0° to 40° C. This linear expansion coefficient is about one-tenth of that of mild steel.

An alloy such as invar steel having iron and nickel as its major components is generally etched using an aqueous solution of ferric chloride ($FeCl_3$) as an etching solution. During the etching process, by the reaction of Ni and Fe the etching solution produces $FeCl_2$ and $NiCl_2$ and the like. However, since $FeCl_2$ and $NiCl_2$ do not have an etching ability, the etching capability is degraded as the amount of these materials in the etching solution increases. As a result, it is difficult to maintain the etching capability of the solution at a level required to perform etching. However, in the case of etching a mild steel plate, chloride gas is constantly dissolved, as indicated by formulae (1) below, so that ferrous chloride is oxidized to form ferric chloride and thus to allow recycling:

$$Fe+2FeCl_3\rightarrow3FeCl_3$$

$$3FeCl_2+(3/2)Cl_2\rightarrow3FeCl_3 \quad (1)$$

Furthermore, by adding water to the etching solution, the etching solution can be controlled to have a predetermined etching capacity level.

SUMMARY OF THE INVENTION

It is an object of the present invention to provide a method for etching an Fe-Ni alloy so as not to substantially decrease the etching capability of an etching solution when the Fe-Ni alloy is etched by an etching solution which contains ferric chloride.

In order to achieve the above object of the present invention, there is provided a method for etching an Fe-Ni alloy by reacting the Fe-Ni alloy with an etching solution which contains ferric chloride, comprising the step of adding $Cl_2$ and $H_2O$ in a reaction system of the etching solution and the Fe-Ni alloy, thereby producing ferric chloride and hence, preventing degradation of an etching capability of the etching solution.

The etching solution containing ferric chloride produced by adding $Cl_2$ and $H_2O$ to an etching solution which contains ferric chloride and which reacts with mild steel, may be further added in a resultant reaction system of the etching solution and the Fe-Ni alloy. According to the present invention, the Fe-Ni alloy is preferably invar steel which is formed into a shadow mask sheet.

DETAILED DESCRIPTION OF THE PREFERRED EMBODIMENTS

Figure 1:
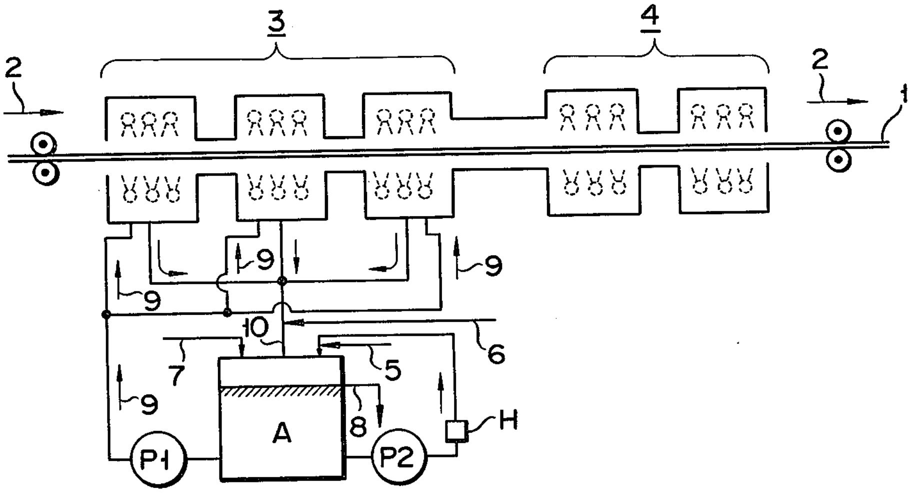
FIG. 1 is a process chart for explaining an etching method according to an embodiment of the present invention.

The reaction of invar steel with an aqueous solution of ferric chloride is shown by formula (2) as follows:

$$0.65Fe+0.35Ni+2.0FeCl_3$$

$$\rightarrow2.65FeCl_2+0.35NiCl_2 \quad (2)$$

As may be apparent from formula (2), etching of 1 mol of invar steel results in the consumption of 2 mols of ferric chloride and production of 3 mols of a chloride which does not contribute to etching. This indicates that the etching capability of the etching solution is greatly degraded while the invar steel shadow masks are being produced by etching. The etching time must be prolonged to obtain a shadow mask which has a predetermined aperture size, thereby degrading production efficiency. When the amount of the chloride which does not contribute to etching is further increased, the reaction system is disturbed to produce a hydroxide, thereby forming nonuniform apertures. When $Cl_2$ is added in this reaction system, a new reaction system is given by formula (3) as follows:

$$0.65Fe+0.35Ni+2.0FeCl_3+1.325Cl_2$$

$$\rightarrow2.65FeCl_3+0.35NiCl_2 \quad (3)$$

In comparison with formula (2), the amount of the chloride which does not contribute to etching is decreased to 1/9 in formula (3). Furthermore, water is added to balance an increase in specific gravity of the solution which is caused by etched iron, nickel and chlorine gas, thereby keeping the specific gravity of the etching solution constant. As a result, degradation of the etching solution can be, to a large extent, prevented.

According to formula (1), when mild steel is etched by a solution of ferric chloride, as previously mentioned, 2 mols of ferric chloride is used to etch 1 mol of iron and then to produce 3 mols of ferrous chloride.

This ferrous chloride reacts with 3/2 mol of chlorine gas to produce 3 mols of ferric chloride. In this cycle of reac 'on, the amount of ferric chloride is increased by 1 mol. For example, in the case of etching one shadow mask sheet of 22" type, 95.6 g of iron are etched, so that the increase in $FeCl_3$ can be computed using equation (4), $$95.60\text{ g/Fe (molecular weight)} = X/FeCl_3\text{ (molecular weight)} \quad (4)$$

then $$95.60\text{ g}/55.84 = X/162.21$$

therefore $$X \approx 250\text{ g } (FeCl_3, 100\%) \quad (5)$$

In other words, when a mild steel shadow mask sheet of 22" type is etched, there is an increase of about 250 g (i.e., about 500 g when measured for the normal 50 wt. % of $FeCl_3$) of ferric chloride ($FeCl_3$:100%). When the level of ferric chloride is constantly increased in the etching solution which is subjected to formula (2), the ratio of the amount of nickel chloride to the total amount of the etching solution; can be checked as compared with the reaction system shown by formula (3), thereby preventing the degradation of the etching capability of the etching solution.

EXAMPLE 1

As shown in FIG. 1, an invar steel sheet 1 having a predetermined resist pattern on its surface was continuously fed in a direction indicated by arrows 2 and was treated through an etching process 3, a photoresist film removal process 4 a water washing process, and a dry process (not shown). The invar steel sheet 1 was then formed into a shadow mask. In the etching process 3 of the invar steel sheet 1, an etching solution containing $FeCl_3$ was fed from a tank A through a pump P1 in a direction indicated by arrows 9. $FeCl_2$ and $NiCl_2$ which were produced by etching were returned to the tank A. Meanwhile, the etching solution in the tank A was recycled through a pump P2, and chlorine gas was fed into the recycle line through a line 5. The temperature of the etching solution in the tank A was controlled by a heat exchanger (H). Furthermore, in order to control the specific gravity of the etching solution, water was then supplied from a line 6 to a line 10 through which the etching solution was recycled. Hydrochloric acid was then supplied to the tank A through a line 7 so as to control the pH of the etching solution. Part of the increased amount of etching solution was discharged from a line 8. The discharged portion of the etching solution was then treated by an alkali neutralization process, an oxidation process, a hot water washing process, and a filtration/separation process. As a result, the degradation of the etching capability of the etching solution was, to a great extent, prevented. It is noted that a predetermined amount of an etching solution containing fresh $FeCl_3$ and stored in another tank (not shown) may be constantly supplied to the tank A.

EXAMPLE 2

Figure 2:
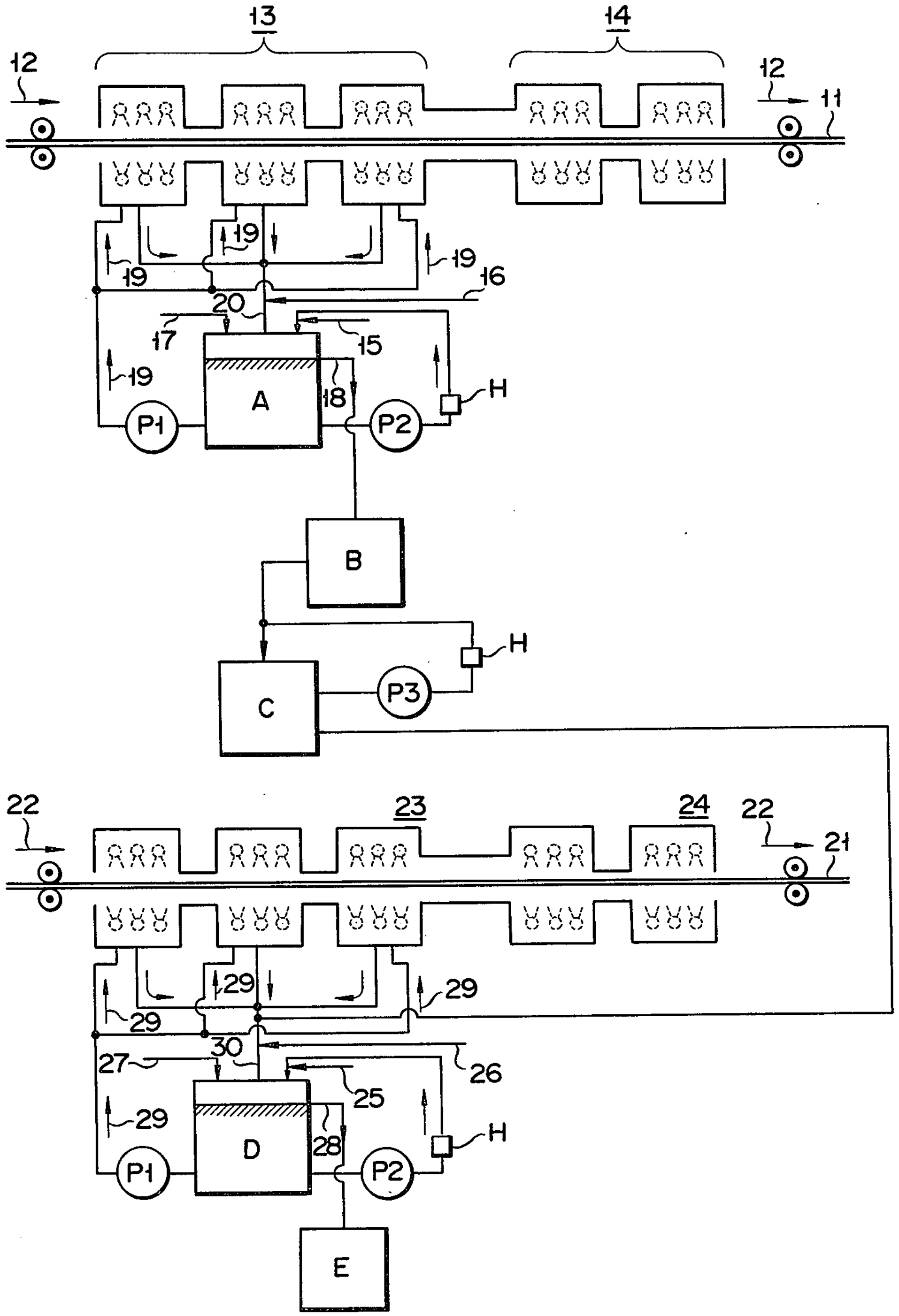
FIG. 2 is a process chart for explaining an etching method according to another embodiment of the present invention.

As shown in FIG. 2, a mild steel sheet made of pure iron 11 having a predetermined resist pattern on its surface was continuously fed in a direction indicated by arrows 12 and was treated in an etching process 13, a photoresist film removal process 14 a water washing process and a dry process (not shown). The sheet 11 was then formed into a shadow mask. Meanwhile, an invar steel sheet 21 having a predetermined resist pattern on its surface was continuously fed in a direction indicated by arrows 22 and was treated in an etching process 23, a photoresist film removal process 24 a water washing process and a dry process (not shown). The sheet 21 was then formed into a shadow mask.

In the etching process 13 of the mild steel sheet 11, an etching solution was fed from a tank A through a pump P1 in a direction indicated by arrows 19. $FeCl_2$ which was produced by an etching reaction was returned to the tank A. Meanwhile, the etching solution in the tank A was recycled through a pump P2 and a heat exchanger (H) for temperature control. Chlorine gas was then supplied from a line 15 to the recycle line. Furthermore, in order to control the specific gravity of the etching solution, water was supplied from a line 16 to a line 20 through which the etching solution was recycled. Hydrochloric acid was supplied from a line 17 to the tank A so as to control the pH of the etching solution, thereby increasing the amount of $FeCl_3$ therein. The etching solution containing the increased amount of ferric chloride was supplied to a storage tank B through a line 18 and was then stored in a storage tank C. Then, the etching solution stored in a storage tank C was supplied to a line 30 of the etching process 23 so as to etch the inver steel sheet 21.

The etching solution stored in a storage tank C was recycled through a pump P3 and a heat exchanger H so as to regulate the temperature of the etching solution.

Meanwhile, in an etching process 23 of the invar steel sheet 21, an etching solution containing $FeCl_3$ was fed from a tank D through a pump P1 so as to etch the invar steel sheet 21. The etching solution was returned to the tank D after etching. Meanwhile, the etching solution in the tank D was recycled through the pump P2 and the heat exchanger H so as to control its temperature, and chlorine gas was supplied from a line 25 to the recycle line. In order to control the specific gravity of the etching solution, water was supplied from a line 26 to a line 30 through which the etching solution was recycled. Furthermore, hydrochloric acid was supplied from a line 27 to the tank D so as to control the pH of the etching solution. The etching solution which was so controlled was supplied in a predetermined amount to the etching process 23. The total increase in the etching solution portion which was supplied in a predetermined amount and the etching solution portion which was increased was stored in a tank E through a line 28. The etching solution in the tank E was then supplied into an alkali neutralization process, an oxidation process, a hot water washing process, and a filtration/separation process, and was then supplied in a predetermined amount in accordance with a total processing capability. As a result, as compared with the method in Example 1, the ratio of the amount of nickel chloride to the total amount of the etching solution for etching the invar steel was decreased, thus substantially preventing a significant degradation of the etching capability of the etching solution. It is noted that a fresh etching solution containing $FeCl_3$ and stored in another tank (not shown) may be constantly supplied to the tank D in a predetermined amount.

What we claim is:

1. A method for etching an Fe-Ni alloy comprising the steps of:

(1) exposing and reacting the Fe-Ni alloy to an etching solution system containing ferric chloride, (2) supplementing the used etching solution by adding chlorine to the solution, to provide additional ferric chloride, and water, to adjust and maintain the specific gravity of the etching solution substantially constant, and (3) additionally supplementing the thus-treated etching solution of step (2) with a ferric chloride-containing etching solution, to which chlorine and water have previously been added and which has reacted with an etched mild steel, thereby decreasing the ratio of the amount of nickel chloride to the total amount of the etching solution of step (3).

2. The method of claim 1 including the additional step of adding fresh ferric chloride-containing etching solution to the etching solution system.

3. The method of claim 1 in which the Fe-Ni alloy etched is invar steel.

4. The method of claim 3 in which the invar steel is formed into a shadow mask sheet.

5. The method of claim 1 including the additional step of adding hydrochloric acid as required to adjust the pH of the etching solution system.

* * * * *